United States Patent
Chang (10) Patent No.: US 9,058,434 B2
(45) Date of Patent: Jun. 16, 2015

(54) PERIPHERAL APPARATUS AND SYNCHRONIZATION METHOD THEREOF

(71) Applicant: DEXIN CORPORATION, New Taipei (TW)

(72) Inventor: Yuan-Jung Chang, New Taipei (TW)

(73) Assignee: DEXIN CORPORATION, New Taipei (TW)

(*) Notice: Subject to any disclaimer, the term of this patent is extended or adjusted under 35 U.S.C. 154(b) by 123 days.

(21) Appl. No.: 13/898,531

(22) Filed: May 21, 2013

(65) Prior Publication Data

US 2014/0351459 A1 Nov. 27, 2014

(51) Int. Cl.
*G06F 3/00* (2006.01)
*G06F 13/38* (2006.01)
*G06F 13/42* (2006.01)
*G06F 13/00* (2006.01)

(52) U.S. Cl.
CPC ............ *G06F 13/385* (2013.01); *G06F 13/423* (2013.01)

(58) Field of Classification Search
CPC ............ G06F 3/01; G06F 3/00; G06F 13/00; G06F 2003/00
USPC .................. 710/8–10, 15–18, 36, 46, 72–73
See application file for complete search history.

(56) References Cited

U.S. PATENT DOCUMENTS

| | | | |
|---|---|---|---|
| 2010/0195539 A1* | 8/2010 | Tian et al. | 370/255 |
| 2011/0021269 A1* | 1/2011 | Wolff-Peterson et al. | 463/29 |
| 2013/0086528 A1* | 4/2013 | Lee | 715/838 |
| 2013/0205206 A1* | 8/2013 | Hawver et al. | 715/704 |
| 2014/0019652 A1* | 1/2014 | Soffer | 710/73 |

* cited by examiner

*Primary Examiner* — Christopher Shin
(74) *Attorney, Agent, or Firm* — Li & Cai Intellectual Property (USA) Office (57) ABSTRACT

A synchronization method is provided for a peripheral apparatus. The peripheral apparatus comprises a first peripheral device and a second peripheral device, wherein the first peripheral device is coupled to a host and the first peripheral device runs in a first operation mode. The synchronization method comprises the following steps: when a second peripheral device is coupled to the host, the second peripheral device obtains a synchronization signal from the host; and the second peripheral device runs in a second operation mode based on the synchronization signal, wherein the second operation mode is same as the first operation mode.

20 Claims, 6 Drawing Sheets

PERIPHERAL APPARATUS AND SYNCHRONIZATION METHOD THEREOF

BACKGROUND OF THE INVENTION

1. Field of the Invention

The present invention relates to a peripheral apparatus and synchronization method thereof; in particular, to a peripheral apparatus, suitable for being coupled to a host, and synchronization method thereof.

2. Description of Related Art

Today the computer technology has progressed greatly, and the application fields of computers have been also diversified more and more. Computers have become a necessary apparatuses in daily life, wherein a user may couple a peripheral apparatus to a computer so as to expand additional functions of a computer. Therefore, a derivative peripheral apparatus of a computer, such as mouse, keyboard, earphone or speaker, is also diversified more and more.

However, some peripheral apparatuses described above have luminous elements, and the luminous elements will generate optical effect in visual perception; or some peripheral apparatuses have fans, and the fans may dissipate the heat generated by said peripheral apparatuses.

SUMMARY OF THE INVENTION

The object of the present invention is to provide a peripheral apparatus and synchronization method thereof, so as to solve the above problems.

The present invention proposes a synchronization method of a peripheral apparatus, and the peripheral apparatus comprise a first peripheral device and a second peripheral device, wherein the first peripheral device is coupled to a host and the first peripheral device runs in a first operation mode. The synchronization method comprises the following steps: when a second peripheral device is coupled to the host, the second peripheral device obtains a synchronization signal from the host; and the second peripheral device runs in a second operation mode based on the synchronization signal, wherein the second operation mode is same as the first operation mode.

According to an embodiment of the present invention, the synchronization signal is provided by a detecting program installed in a host, and the steps for the detecting program to generate the synchronization signal include: outputting a polling signal to a first peripheral device when a second peripheral device is coupled to a host; receiving an informed signal when the first peripheral device responds to the polling signal; and generating a synchronization signal to the second peripheral device according to the informed signal.

According to an embodiment of the present invention, the synchronization signal is provided by a detecting program installed in a host, and the steps for the detecting program to generate the synchronization signal include: outputting a synchronization signal respectively to a first peripheral device and a second peripheral device when a second peripheral device is coupled to a host, wherein the synchronization signal is a reset instruction, such that the first peripheral device and the second peripheral device are synchronously initialized and restarted.

The present invention proposes a peripheral apparatus, which is suitable for being coupled to a host and comprises: a first peripheral device, coupled to a host and running in a first operation mode; and a second peripheral device, having a micro-processor and a memory; wherein the memory stores program codes executed by the micro-processor and the following steps are performed: when the second peripheral device is coupled to the host, the second peripheral device obtains a synchronization signal from the host; and the second peripheral device runs in a second operation mode based on the synchronization signal, wherein the second operation mode is same as the first operation mode.

A specific means of the present invention is to use a peripheral apparatus including a first peripheral device and a second peripheral device. When the second peripheral device is coupled to the host, the second peripheral device obtains a synchronization signal from the host; and the second peripheral device runs in a second operation mode based on the synchronization signal, wherein the second operation mode is same as the first operation mode, thereby a running consistency of the peripheral apparatus is enhanced.

In order to further the understanding regarding the present invention, the following embodiments are provided along with illustrations to facilitate the disclosure of the present invention. However, the description and drawings are merely provided for reference and illustration, without any intention to be used for limiting the present invention.

DETAILED DESCRIPTION OF THE PREFERRED EMBODIMENTS

Figure 1:
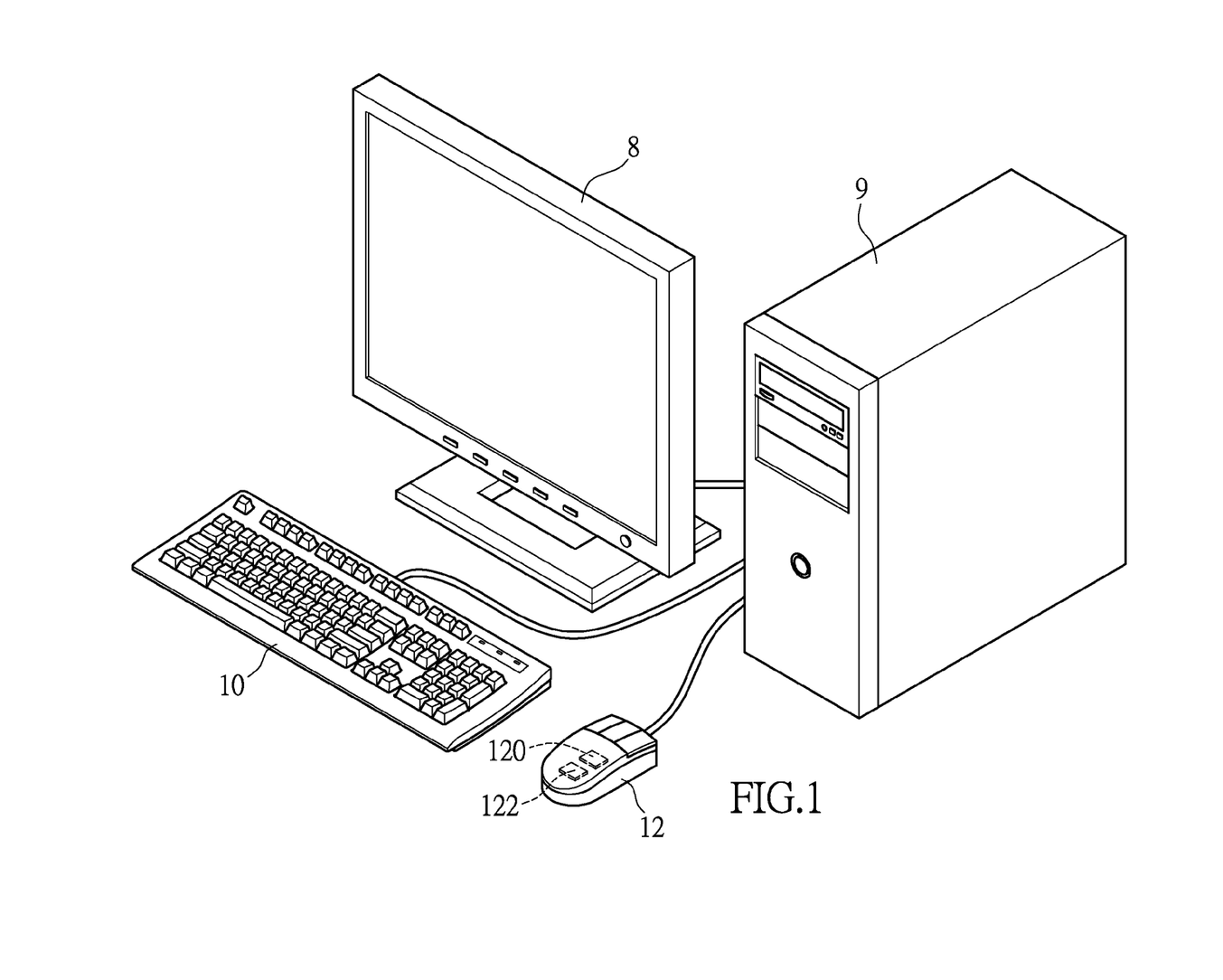
FIG. 1 shows an operation schematic diagram of a peripheral apparatus according to an embodiment of the present invention.

FIG. 1 shows an operation schematic diagram of a peripheral apparatus according to an embodiment of the present invention. Please refer to FIG. 1. The present invention proposes a peripheral apparatus, which is suitable for being coupled to a host and comprises, for example, a first peripheral device and a second peripheral device, wherein the first peripheral device is coupled to a host and runs in a first operation mode. In practice, the host may be, for example, a computer host, a notebook, a tablet computer, a mobile communication device or a Personal Digital Assistant (PDA). Type of the host is not limited in the present embodiment. In order to describe conveniently, the host of the present embodiment is illustrated by a computer host 9.

A peripheral apparatus comprises a plurality of products derived according to the computer host 9, wherein the first and the second peripheral devices are respectively a keyboard, a mouse, an earphone, a headset, a speaker, a camera or a bungee. In order to describe conveniently, the first peripheral device of the present embodiment is illustrated by a keyboard 10, while the second peripheral device is illustrated by a mouse 12. In other embodiments, the first and the second peripheral devices are respectively a wireless keyboard, a wireless mouse, a wireless earphone, a headset, a speaker, a network camera or a bungee, wherein the first peripheral device may be same as the second peripheral device, or the first peripheral device may be different from the second peripheral device. The types of the first and the second peripheral devices are not limited in the present embodiment.

In addition, an operation fashion of the first operation mode is luminous frequency of a luminous element in a keyboard 10, alteration of luminous color of a luminous element and/or rotation speed of a fan; or an operation fashion of the first operation mode is to operate in a game setting instruction used by the game. In order to describe conveniently, the first operation mode in the present embodiment is to let the luminous element in keyboard 10 flicker with a luminous frequency of 15 times per minute, thereby a situation atmosphere lamp light is generated. In other embodiment, the light emitted by the luminous element in the keyboard 10 is changed in a sequence of yellow light, green light, red light; or the fan of the keyboard 10 is operated with a rotation speed of 60 revolutions per minute; or the keyboard 10 has a vocational gamer setting, a professional gamer setting and a general gamer setting, and the first operation mode may be, for example, a vocational gamer setting. The type of the first operation mode is not limited in the present embodiment.

Next, under condition that the keyboard 10 is coupled to the computer host 9, when the mouse 12 is coupled to the computer host 9, the mouse 12 obtains a synchronization signal from the computer host 9. The mouse 12 runs in a second operation mode based on the synchronization signal, wherein the second operation mode is same as the first operation mode. In practice, the mouse 12 has a micro-processor 120 and a memory 122, wherein the memory 122 stores the program codes executed by the micro-processor 120, such that the micro-processor 120 performs the following steps: when the mouse 12 is coupled to the computer host 9, the micro-processor 120 of the mouse 12 obtains a synchronization signal from the computer host 9, and the micro-processor 120 of the mouse 12 runs in a second operation mode based on the synchronization signal, wherein the second operation mode is same as the first operation mode. In addition, the second operation mode is the luminous frequency of the luminous element of the mouse 12, alteration of luminous color of a luminous element and/or rotation speed of a fan; or an operation fashion of the second operation mode is to operate in a game setting instruction used by the game. The type of the second operation mode is not limited in the present embodiment.

To describe in detail, the micro-processor 120 is coupled to a memory 122. The micro-processor 120 may be, for example, a CPU or a Micro Control Unit (MCU) etc., used for performing a signal computation and processing among each element in the mouse 12. The type of the micro-processor 120 is not limited in the present embodiment. The memory 122 may be, for example, composed of non-volatile memory such as flash memory or EEPROM. The type of the memory 122 is not limited in the present embodiment.

The synchronization signal may be a signal that indicates, for example, a luminous frequency of a luminous element in the keyboard 10, such that the luminous element of the mouse 12 is synchronously actuated. When the micro-processor 120 receives the synchronization signal, the micro-processor 120 will execute the program codes that control the luminous element, thereby the luminous element of the mouse 12 is also actuated synchronously with the luminous element of the keyboard 10, so as to attain a consistent flickering. In other embodiments, the synchronization signal may be, for example, a signal that indicates, for example, alteration of luminous color of a luminous element and/or rotation speed of a fan in the keyboard 10; and/or indicates that the keyboard 10 operates in a first operation mode used by the game, such that the mouse 12 is synchronously actuated. The type of the synchronization signal is not limited in the present embodiment.

In addition, the mode for the micro-processor 120 of a mouse 12 to obtain a synchronization signal from the computer host 9 is realized by either a detecting program installed in the computer host 9 or a firmware in the mouse 12. The mode for the mouse 12 to obtain a synchronization signal from the computer host 9 is not limited in the present embodiment.

By way of example, the synchronization signal is provided by a detecting program installed in the computer host 9, and the steps for the detecting program to generate the synchronization signal include: when the mouse 12 is coupled to the computer host 9, a polling signal is outputted to the keyboard 10. Of course, the keyboard 10 will respond an informed signal according to the polling signal. When the computer host 9 receives the informed signal responded by the keyboard 10, the computer host 9 will generate a synchronization signal to the mouse 12 according to the informed signal.

By way of example again, the synchronization signal is provided by a detecting program installed in the computer host 9, and the steps for the detecting program to generate the synchronization signal include: when the mouse 12 is coupled to the computer host 9, the computer host 9 outputs a synchronization signal respectively to the keyboard 10 and the mouse 12, wherein the synchronization signal is a reset instruction, so as to let the keyboard 10 and the mouse 12 be synchronously initialized and restarted.

In addition, the mode of the present invention to obtain a synchronization signal is realized by a firmware in the mouse 12, for example, when the mouse 12 is coupled to a computer host 9, the mouse 12 is simulated to be a keyboard device, so as to obtain the synchronization signal from the computer host 9. The mouse 12 intercepts a keyboard lamp control instruction that is outputted by the computer host 9 to the mouse 12, and the keyboard lamp control instruction acts as a synchronization signal. The keyboard lamp control instruction is a reset instruction, and at the time when the mouse 12 obtains the synchronization signal from the computer host 9, the keyboard 10 also synchronously obtains the synchronization signal from the computer host 9.

Base on the above, at first a user couples the keyboard 10 to the computer host 9, wherein the luminous element of the keyboard 10 flickers with a luminous frequency of 15 times per minute. Next, when the user couples the mouse 12 to the computer host 9, the mouse 12 obtains a synchronization signal from the computer host 9. The mouse 12 will run in a second operation mode based on the synchronization signal, wherein the second operation mode is same as the first operation mode, so that the luminous elements of the keyboard 10 and the mouse 12 will operate synchronously with same luminous frequency.

It is worth noting that in other embodiments the keyboard 10 has, for example, a vocational gamer setting, a professional gamer setting and a general gamer setting. Of course, the reaction speed of keying of the keyboard 10 can be set according to different levels of gamers. The first operation mode is set according to, for example, a vocational gamer. When the mouse 12 is coupled to the computer host 9, the mouse 12 obtains a synchronization signal from the computer host 9. The mouse 12 runs in a second operation mode based on the synchronization signal, wherein the second operation mode is same as the first operation mode, so that the mouse 12 may also perform a vocational gamer setting. For example, the polling rate of a keying reaction operation instruction of the mouse 12 is set according to a vocational gamer. Therefore, the keyboard 10 and the mouse 12 will run synchronously in the first and the second operation modes set by the vocational gamer so as to operate in a computer game.

Figure 2:
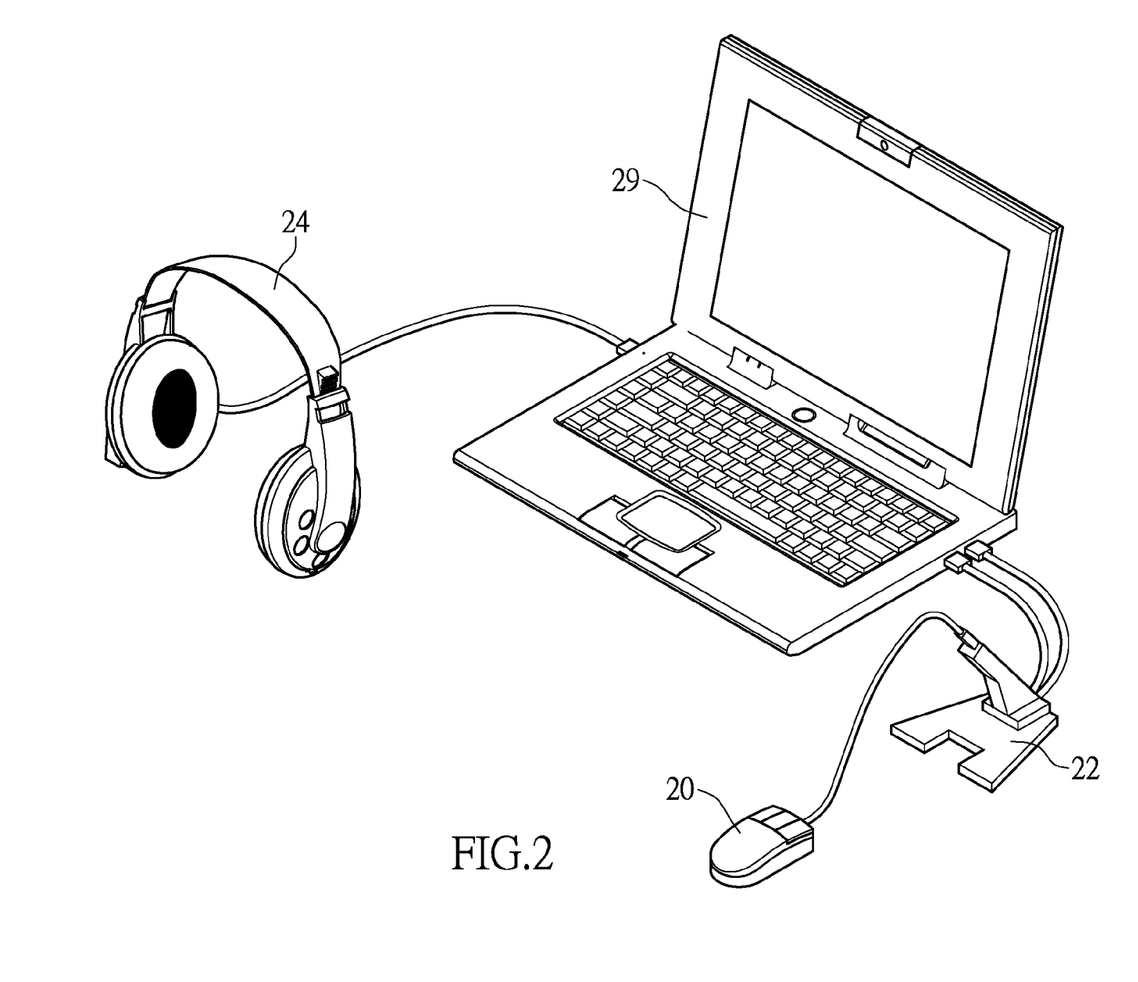
FIG. 2 shows an operation schematic diagram of a peripheral apparatus according to another embodiment of the present invention.

The above peripheral apparatus may be implemented with different types. By way of example, FIG. 2 shows an operation schematic diagram of a peripheral apparatus according to another embodiment of the present invention. Please refer to FIG. 2. The peripheral apparatus of the present embodiment are similar to those of the previous embodiment. For example, the second peripheral device may run in the second operation mode based on the synchronization signal, wherein the second operation mode is same as the first operation mode.

However, the peripheral apparatus shown in FIG. 2 include a first peripheral device, a second peripheral device and a third peripheral device, while the first peripheral device, the second peripheral device and the third peripheral device are coupled respectively to a host sequentially. In order to describe conveniently, the host of the present embodiment may be, for example, a notebook 29, the first peripheral device may be, for example, a mouse 20, the second peripheral device may be, for example, a bungee 22, the third peripheral device may be, for example, an earphone 24. The types of the host, the first, the second, and the third peripheral devices are not limited in the present embodiment.

To describe further, at first, the mouse 20 is coupled to the notebook 29, wherein the luminous element of the mouse 20 runs in a first operation mode. Next, when the bungee 22 is coupled to the notebook 29, the bungee 22 obtains a synchronization signal from the notebook 29. The luminous element of the bungee 22 runs in a second operation mode based on the synchronization signal, wherein the second operation mode is same as the first operation mode, thereby the luminous elements of the mouse 20 and the bungee 22 are synchronous and have a consistent luminous frequency.

Moreover, when the earphone 24 is coupled to the notebook 29, the earphone 24 obtains a synchronization signal from the notebook 29. The luminous element of the earphone 24 runs in a third operation mode based on the synchronization signal, wherein the third operation mode is same as the first operation mode, thereby the luminous elements of the mouse 20, the bungee 22 and the earphone 24 will have a consistent luminous frequency. In other embodiments, the peripheral apparatus may include four, five or more peripheral devices. The types of the peripheral apparatus and the amount of the peripheral devices are not limited in the present embodiment.

Next, the actuation of synchronization method for the peripheral apparatus is further described.

Figure 3:
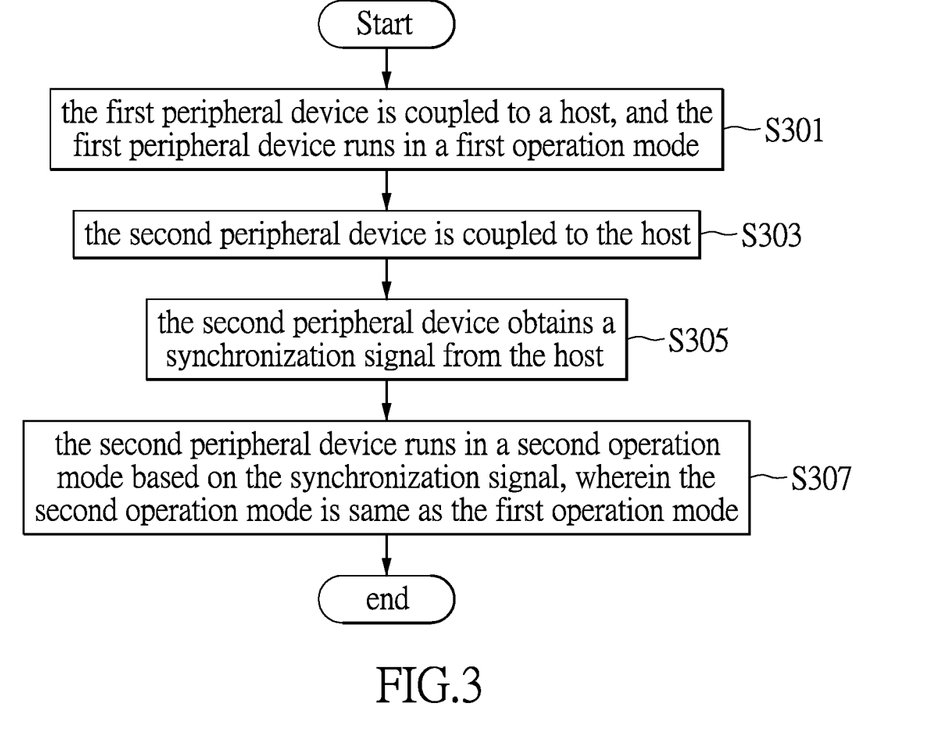
FIG. 3 shows a flow chart of a synchronization method for a peripheral apparatus according to another embodiment of the present invention.

FIG. 3 shows a flow chart of a synchronization method for a peripheral apparatus according to another embodiment of the present invention. Please refer to FIG. 3. A synchronization method for a peripheral apparatus is disclosed. In step S301, the first peripheral device is coupled to a host, and the first peripheral device runs in a first operation mode.

Next, in step S303, the second peripheral device is coupled to the host. In practice, the second peripheral device can be coupled to the host via a universal serial bus (USB), an audio jack, a TRS jack or a High Definition Multimedia Interface (HDMI), thereby the host can detect the second peripheral device.

In step S305, the second peripheral device obtains a synchronization signal from the host. In practice, the second peripheral device can obtain a synchronization signal via a detecting program installed in the host; or the second peripheral device can obtain a synchronization signal via a firmware within itself. By way of example, the detecting program provides the synchronization signal to the second peripheral device, wherein the synchronization signal may be, for example, a signal that indicates the operation of the first peripheral device, so as to let the second peripheral device operate synchronously; or a signal that lets the first and the second peripheral devices perform a reset operation; or a reset signal obtained when the second peripheral device intercepts the signal generated by a device that simulates a keyboard. In addition, the second peripheral device may be coupled to the host wiredly or wirelessly, so as to obtain the synchronization signal from the host. The method for the second peripheral device to obtain the synchronization signal from a host is not limited in the present embodiment.

In step S307, the second peripheral device runs in a second operation mode based on the synchronization signal, wherein the second operation mode is same as the first operation mode. In practice, the second operation mode is the luminous frequency of the luminous element of the second peripheral device, alteration of luminous color of a luminous element and/or rotation speed of a fan; or an operation fashion of the second operation mode is to operate in a game setting instruction used by the game. If the second peripheral device has not received a synchronization signal, the second operation mode will be different from the first operation mode. When the second peripheral device receives a synchronization signal, the second operation mode will be same as the first operation mode.

In practice, a synchronization signal is a signal that indicates the operation status of the first peripheral device, so as to let the second peripheral device operate synchronously. For example, the luminous elements of the first peripheral device flicker according to a time period instruction, wherein the time period instruction may be, for example, a signal that will emit light at each interval of 6 seconds from a reference timing point. Thus the second peripheral device runs in a second operation mode based on a synchronization signal, wherein the second operation mode is same as the first operation mode. Thereby the luminous elements of the second peripheral device may flicker according to the time period instruction.

In addition, the synchronization signal may be a reset instruction, so that the first peripheral device and the second peripheral device are synchronously initialized and restarted. For example, the synchronization signal is a reset time period instruction, wherein the reset time period instruction is a signal that will emit light at each interval of 8 seconds from a reference timing point. Therefore, the first and the second peripheral devices run respectively in the first and the second operation mode based on the synchronization signal, thus the luminous elements of the first and the second peripheral devices may flicker synchronously according to the time period instruction. The type of the synchronization signal is not limited in the present embodiment.

In order to let those skilled in the art more understand, a synchronization method for a peripheral apparatus according to another embodiment is proposed, and the synchronization method for the peripheral apparatus according to said another embodiment is realized by means of a detecting program installed in a host.

Figure 4:
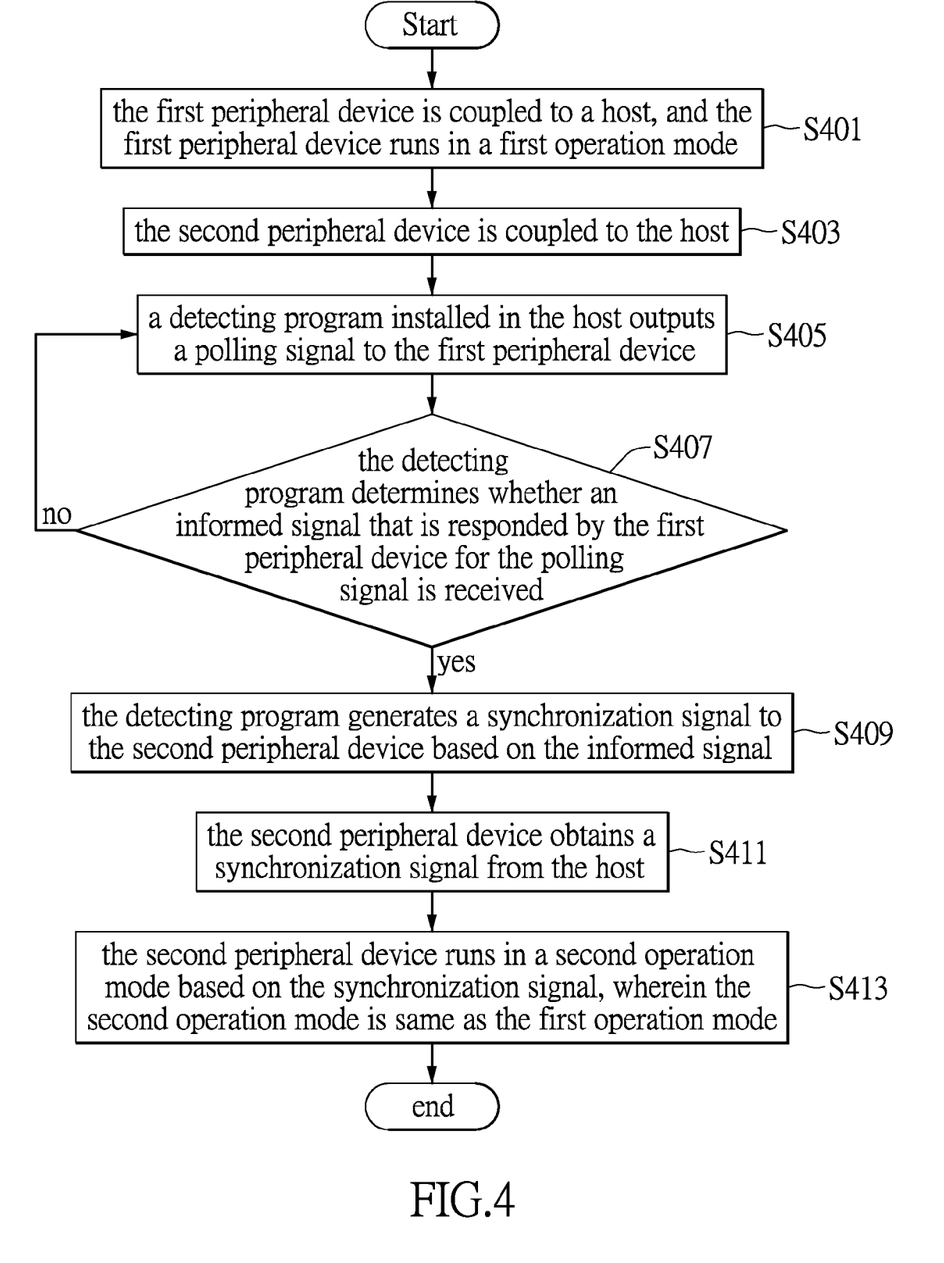
FIG. 4 shows a flow chart of a synchronization method for a peripheral apparatus according to another embodiment of the present invention.

FIG. 4 shows a flow chart of a synchronization method for a peripheral apparatus according to another embodiment of the present invention. Please refer to FIG. 4. A synchronization method for the peripheral apparatus is disclosed. In step S401, the first peripheral device is coupled to a host, and the first peripheral device runs in a first operation mode.

Next, in step S403, the second peripheral device is coupled to the host, wherein the operation and function are same as those of the previous embodiment and will not be described here.

In Step S405, a detecting program installed in the host outputs a polling signal to the first peripheral device. In practice, when the host detects the second peripheral device, the detecting program is automatically started and outputs a polling signal to the first peripheral device, while the polling signal is a signal that queries the status of the first peripheral device. When the first peripheral device receives the polling signal, the first peripheral device starts the operation of generating a response based on the polling signal, thereby the first peripheral device may respond an informed signal to the host.

Next, in step S407, the detecting program determines whether an informed signal that is responded by the first peripheral device for the polling signal is received. In practice, the informed signal is a signal that is used to indicate the status of the first peripheral device and informs the host, thereby the detecting program determines whether an informed signal indicating the status of the first peripheral device is obtained. If the decision result is yes, step S409 is performed. If the decision result is no, return to step S405, and the detecting program outputs a polling signal to the first peripheral device.

In step S409, the detecting program generates a synchronization signal to the second peripheral device based on the informed signal. In practice, the detecting program obtains the informed signal indicating the status of the first peripheral device, i.e., the detecting program knows the status of the first peripheral device. Therefore, the detecting program generates a synchronization signal to the second peripheral device based on the status of the first peripheral device.

Next, in step S411, the second peripheral device obtains a synchronization signal from the host, and, in step S413, the second peripheral device runs in a second operation mode based on the synchronization signal, wherein the second operation mode is same as the first operation mode.

To describe in detail, the informed signal received by the detecting program indicates an operation fashion of the first operation mode of the first peripheral device, and the synchronization signal received by the second peripheral device indicates an operation fashion of the first operation mode of the first peripheral device. As can be known here, the detecting program obtains an operation fashion of the first operation mode of the first peripheral device based on the informed signal, while the second peripheral device obtains an operation fashion of the first operation mode of the first peripheral device based on the synchronization signal. Therefore, the second peripheral device changes the operation fashion of the second operation mode, so as to coincide with the operation fashion of the first operation mode. In this manner, the second operation mode is same as the first operation mode.

Next, the flow chart of a synchronization method for the peripheral apparatus can be realized by different modes.

Figure 5:
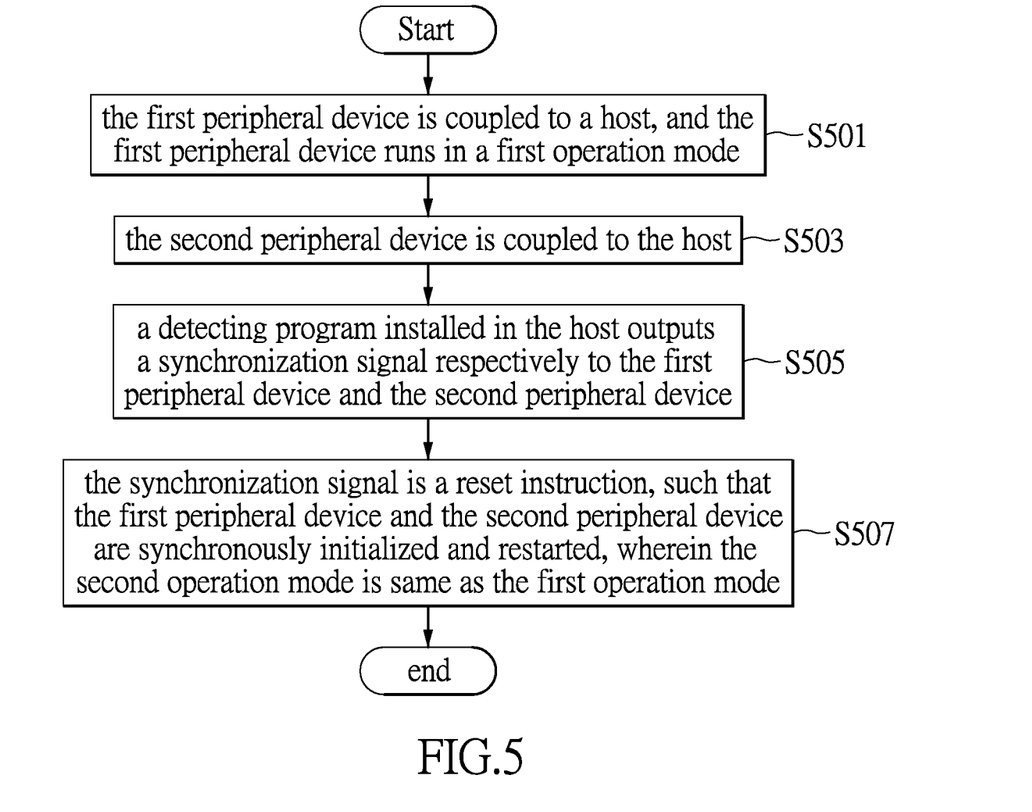
FIG. 5 shows a flow chart of a synchronization method for a peripheral apparatus according to another embodiment of the present invention.

FIG. 5 shows a flow chart of a synchronization method for a peripheral apparatus according to another embodiment of the present invention. Please refer to FIG. 5. The synchronization method for the peripheral apparatus of the present embodiment is similar to that of the previous embodiment. For example, the synchronization method for the peripheral apparatus can let the operation modes of the first and the second peripheral devices be synchronous. However, in step S501 of the synchronization method for the peripheral apparatus of the present embodiment, the first peripheral device is coupled to a host and runs in a first operation mode. Next, in step S503, the second peripheral device is coupled to the host, wherein the operation and function are same as those of the previous embodiment and thus will not be described here.

In step S505, a detecting program installed in a host outputs a synchronization signal respectively to the first and the second peripheral devices. In practice, the synchronization signal is a signal indicating that the first operation mode of the first peripheral device operates synchronously with the second operation mode of the second peripheral device. After the detecting program of a host detects the second peripheral device, the detecting program of the host generates a synchronization signal according to the detected signal in the newly coupled device. Thereby the detecting program outputs the synchronization signal to the first and the second peripheral devices.

In step S507, the synchronization signal is a reset instruction, such that the first and the second peripheral devices are synchronously initialized and restarted, wherein the second operation mode is same as the first operation mode. In practice, the synchronization signal is, for example, a reset instruction of operation such as operation time of peripheral device, reference base time, frequency, rotation speed, setting mode or working period etc. Therefore, when the first and the second peripheral devices receive a synchronization signal, the first and the second peripheral devices are synchronously initialized and restarted. Thereby the second operation mode is same as the first operation mode.

By way of example, the synchronization signal is, for example, a signal indicating that the peripheral devices are synchronously initialized and restarted. Therefore, the first and the second peripheral devices are synchronously initialized and restarted. For example, the luminous element of the first peripheral device flickers with a luminous frequency of 15 times per minute, while the luminous element of the second peripheral device flickers with a luminous frequency of 20 times per minute. The synchronization signal can indicate that the luminous elements of the peripheral devices flicker with a luminous frequency of 25 times per minute. Thereby the first and the second peripheral devices are synchronously initialized and restarted, so that the luminous elements of the first and the second peripheral devices flickers synchronously with a luminous frequency of 25 times per minute.

In other embodiments, the synchronization signal may be a reset signal based on the first or the second operation mode. For example, the luminous element of the first peripheral device flickers with a luminous frequency of 15 times per minute, while the luminous element of the second peripheral device flickers with a luminous frequency of 20 times per minute. Based on the first operation mode, the synchronization signal can indicate that the luminous element of the peripheral device flickers with a luminous frequency of 15 times per minute; or based on the second operation mode, the synchronization signal can indicate that the luminous element of the peripheral device flickers with a luminous frequency of 20 times per minute. Of course, when the detecting program detects the second peripheral device, a signal of operation fashion of the first or the second operation mode can be obtained. The type of the synchronization signal is not limited in the present embodiment.

In order to let those skilled in the art more understand, a synchronization method for a peripheral apparatus according to another embodiment is proposed, and the synchronization method for the peripheral apparatus according to said another embodiment is realized by means of a firmware of the second peripheral device itself.

Figure 6:
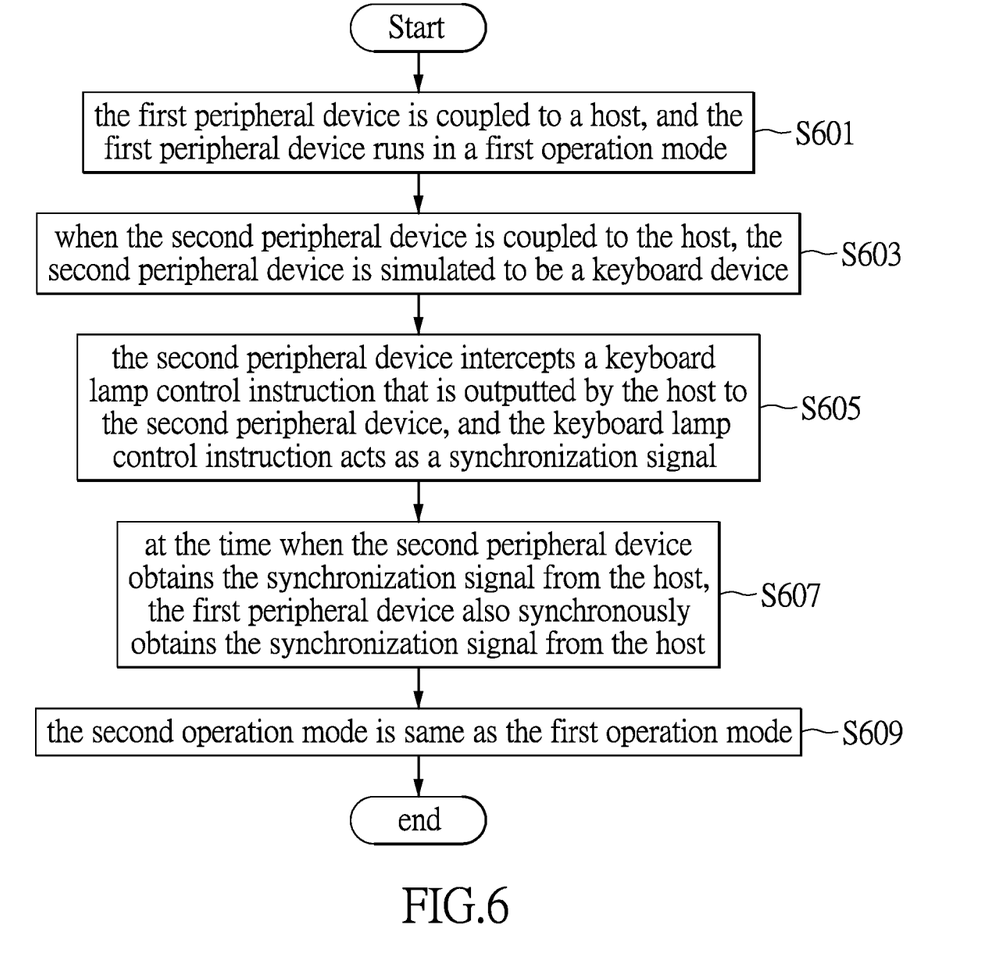
FIG. 6 shows a flow chart of a synchronization method for a peripheral apparatus according to another embodiment of the present invention.

FIG. 6 shows a flow chart of a synchronization method for a peripheral apparatus according to another embodiment of the present invention. Please refer to FIG. 6. In step S601, the first peripheral device is coupled to a host, and the first peripheral device runs in a first operation mode.

Next, in step S603, when the second peripheral device is coupled to the host, the second peripheral device is simulated to be a keyboard device. In practice, the firmware of the second peripheral device itself has a function of simulating a keyboard, wherein when the keyboard is coupled to a host, the host outputs a keyboard lamp control instruction to the keyboard. In the present invention, a signal operation property produced when the keyboard is coupled to a host is utilized. Therefore, when the second peripheral device simulating the keyboard is coupled to a host, the host detects the second peripheral device that simulates the keyboard. Thus, the host will output a keyboard lamp control instruction to the second peripheral device.

In step S605, the second peripheral device intercepts a keyboard lamp control instruction that is outputted to the second peripheral device by the host, and the keyboard lamp control instruction acts as a synchronization signal. Next, in step S607, at the time when the second peripheral device obtains a synchronization signal from a host, the first peripheral device also obtains synchronously a synchronization signal from the host.

In practice, the keyboard lamp control instruction is an instruction that instructs the keyboard to perform a reset. Therefore, the host outputs a keyboard lamp control instruction to the first and the second peripheral devices, and the first peripheral device is, for example, a keyboard, thus the first peripheral device resets the first operation mode according to the keyboard lamp control instruction. At the same time, the second peripheral device simulates a keyboard, and the second peripheral device is, for example, a mouse. Therefore, the second peripheral device can intercept the keyboard lamp control instruction, and the second peripheral device resets the second operation mode of the second peripheral device according to the time or feature of the intercepted keyboard lamp control instruction.

In step S609, the second operation mode is same as the first operation mode, wherein the operation and function are same as those of the previous embodiment and will not be described here.

Summing up the above, the peripheral apparatus is used in the present invention, and the peripheral apparatus includes a first peripheral device and a second peripheral device, wherein the first peripheral device is coupled to a host at first. Then, when the second peripheral device is coupled to the host, the second peripheral device obtains a synchronization signal from the host. The second peripheral device runs in a second operation mode based on the synchronization signal, wherein the second operation mode is same as the first operation mode, thereby a running consistency of the peripheral apparatus is enhanced. In addition, the mode for the second peripheral device to obtain a synchronization signal from the host may be realized by either a detecting program installed in the host or a firmware within the second peripheral device. In this manner, operation convenience of the peripheral apparatus is enhanced in the present invention.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A synchronization method for a peripheral apparatus, the peripheral apparatus comprising a first peripheral device and a second peripheral device, wherein the first peripheral device is coupled to a host and runs in a first operation mode, the synchronization method comprising:
   when the second peripheral device is coupled to the host, the second peripheral device obtaining a synchronization signal from the host; and
   the second peripheral device running in a second operation mode based on the synchronization signal, wherein the second operation mode is same as the first operation mode;
   wherein the synchronization signal is provided by a detecting program installed in the host, and the steps for the detecting program to generate the synchronization signal include:
   outputting a polling signal to the first peripheral device when the second peripheral device is coupled to the host;
   receiving an informed signal when the first peripheral device responds to the polling signal; and
   generating the synchronization signal to the second peripheral device according to the informed signal.

2. The synchronization method according to claim 1, wherein the informed signal received by the detecting program is a signal that indicates an operation fashion of the first operation mode of the first peripheral device, and the synchronization signal received by the second peripheral device is a signal that indicates an operation fashion of the first operation mode of the first peripheral device.

3. The synchronization method according to claim 1, wherein an operation fashion of the first operation mode is luminous frequency of a luminous element, alteration of luminous color of a luminous element and/or rotation speed of a fan.

4. The synchronization method according to claim 1, wherein the operation fashion of the first operation mode is that the first peripheral device operates in a game setting instruction used by the game.

5. A synchronization method for a peripheral apparatus, the peripheral apparatus comprising a first peripheral device and a second peripheral device, wherein the first peripheral device is coupled to a host and runs in a first operation mode, the synchronization method comprising:
   when the second peripheral device is coupled to the host, the second peripheral device obtaining a synchronization signal from the host; and
   the second peripheral device running in a second operation mode based on the synchronization signal, wherein the second operation mode is same as the first operation mode;
   wherein the second peripheral device intercepts a keyboard lamp control instruction that is outputted by the host to the second peripheral device, and the keyboard lamp control instruction acts as a synchronization signal.

6. The synchronization method according to claim 5, wherein the keyboard lamp control instruction is a reset instruction.

7. The synchronization method according to claim 5, wherein at the time when the second peripheral device obtains the synchronization signal from the host, the first peripheral device also synchronously obtains the synchronization signal from the host.

8. The synchronization method according to claim 5, wherein when the second peripheral device is coupled to the host, the second peripheral device is simulated to be a keyboard device, so as to obtain the synchronization signal from the host.

9. The synchronization method according to claim 5, wherein an operation fashion of the first operation mode is luminous frequency of a luminous element, alteration of luminous color of a luminous element and/or rotation speed of a fan.

10. A synchronization method for a peripheral apparatus, the peripheral apparatus comprising a first peripheral device and a second peripheral device, wherein the first peripheral device is coupled to a host and runs in a first operation mode, the synchronization method comprising:
when the second peripheral device is coupled to the host, the second peripheral device obtaining a synchronization signal from the host; and
the second peripheral device running in a second operation mode based on the synchronization signal, wherein the second operation mode is same as the first operation mode;
wherein the synchronization signal is provided by a detecting program installed in the host, and the steps for the detecting program to generate the synchronization signal include:
outputting the synchronization signal respectively to the first peripheral device and the second peripheral device when the second peripheral device is coupled to the host, wherein the synchronization signal is a reset instruction, such that the first peripheral device and the second peripheral device are synchronously initialized and restarted.

11. A peripheral apparatus, suitable for being coupled to a host and comprising:
a first peripheral device, coupled to the host and running in a first operation mode; and
a second peripheral device, having a micro-processor and a memory;
wherein the memory stores program codes executed by the micro-processor and the following steps are performed:
when the second peripheral device is coupled to the host, the second peripheral device obtaining a synchronization signal from the host; and
the second peripheral device running in a second operation mode based on the synchronization signal, wherein the second operation mode is same as the first operation mode;
wherein the synchronization signal is provided by a detecting program installed in the host, and the steps for the detecting program to generate the synchronization signal include:
outputting a polling signal to the first peripheral device when the second peripheral device is coupled to the host;
receiving an informed signal when the first peripheral device responds to the polling signal; and
generating the synchronization signal to the second peripheral device according to the informed signal.

12. The peripheral apparatus according to claim 11, wherein the informed signal received by the detecting program is a signal that indicates an operation fashion of the first operation mode of the first peripheral device, and the synchronization signal received by the second peripheral device is a signal that indicates an operation fashion of the first operation mode of the first peripheral device.

13. The peripheral apparatus according to claim 11, wherein an operation fashion of the first operation mode is luminous frequency of a luminous element of the first peripheral device, alteration of luminous color of a luminous element and/or rotation speed of a fan.

14. The peripheral apparatus according to claim 11, wherein the operation fashion of the first operation mode is that the first peripheral device operates in a game setting instruction used by the game.

15. The peripheral apparatus according to claim 11, wherein the first and the second peripheral devices are respectively a keyboard, a mouse, an earphone, a headset, a horn, a camera or a bungee.

16. A peripheral apparatus, suitable for being coupled to a host and comprising:
a first peripheral device, coupled to the host and running in a first operation mode; and
a second peripheral device, having a micro-processor and a memory;
wherein the memory stores program codes executed by the micro-processor and the following steps are performed:
when the second peripheral device is coupled to the host, the second peripheral device obtaining a synchronization signal from the host; and
the second peripheral device running in a second operation mode based on the synchronization signal, wherein the second operation mode is same as the first operation mode;
wherein the second peripheral device intercepts a keyboard lamp control instruction that is outputted by the host to the second peripheral device, and the keyboard lamp control instruction acts as a synchronization signal.

17. The peripheral apparatus according to claim 16, wherein at the time when the second peripheral device obtains the synchronization signal from the host, the second peripheral device is simulated to be a keyboard device, so as to obtain the synchronization signal from the host.

18. The peripheral apparatus according to claim 16, wherein the keyboard lamp control instruction is a reset instruction.

19. The peripheral apparatus according to claim 15, wherein an operation fashion of the first operation mode is luminous frequency of a luminous element of the first peripheral device, alteration of luminous color of a luminous element and/or rotation speed of a fan.

20. A peripheral apparatus, suitable for being coupled to a host and comprising:
a first peripheral device, coupled to the host and running in a first operation mode; and
a second peripheral device, having a micro-processor and a memory;
wherein the memory stores program codes executed by the micro-processor and the following steps are performed:
when the second peripheral device is coupled to the host, the second peripheral device obtaining a synchronization signal from the host; and
the second peripheral device running in a second operation mode based on the synchronization signal, wherein the second operation mode is same as the first operation mode;
wherein the synchronization signal is provided by a detecting program installed in the host, and the steps for the detecting program to generate the synchronization signal include:
outputting the synchronization signal respectively to the first peripheral device and the second peripheral device when the second peripheral device is coupled to the host, wherein the synchronization signal is a reset instruction, such that the first peripheral device and the second peripheral device are synchronously initialized and restarted.

* * * * *